United States Patent
Brown

(10) Patent No.: US 8,430,637 B2
(45) Date of Patent: Apr. 30, 2013

(54) SEMI-RIGID WIND BLADE

(76) Inventor: Adam Richard Brown, Windsor, NY (US)

( * ) Notice: Subject to any disclaimer, the term of this patent is extended or adjusted under 35 U.S.C. 154(b) by 943 days.

(21) Appl. No.: 12/492,352

(22) Filed: Jun. 26, 2009

(65) Prior Publication Data

US 2010/0028159 A1 Feb. 4, 2010

Related U.S. Application Data

(60) Provisional application No. 61/085,121, filed on Jul. 31, 2008.

(51) Int. Cl.
*B64C 11/32* (2006.01)

(52) U.S. Cl.
USPC .................. 416/132 A; 416/132 B; 416/205; 416/206; 416/223 R

(58) Field of Classification Search .................. 416/206, 416/205, 223 R, 132 A, 132 B, 219 R; 415/4.3, 415/4.5; 290/44, 55
See application file for complete search history.

(56) References Cited

U.S. PATENT DOCUMENTS

| | | | | |
|---|---|---|---|---|
| 802,144 | A * | 10/1905 | Harrington | 416/41 |
| 991,331 | A * | 5/1911 | Lawrence | 416/132 R |
| 3,995,170 | A * | 11/1976 | Graybill | 290/55 |
| 4,003,676 | A * | 1/1977 | Sweeney et al. | 416/132 B |
| 4,191,507 | A * | 3/1980 | DeBerg | 416/117 |
| 4,678,923 | A * | 7/1987 | Trepanier | 290/55 |
| 4,681,512 | A * | 7/1987 | Barnard | 416/132 B |
| 5,110,261 | A * | 5/1992 | Junkin | 416/204 R |
| 5,462,407 | A * | 10/1995 | Calvo | 416/132 A |
| 6,039,533 | A * | 3/2000 | McCabe | 415/146 |
| 6,390,778 | B1 * | 5/2002 | Lee | 416/210 R |
| 6,811,377 | B2 * | 11/2004 | Tang | 416/132 A |
| 7,037,074 | B2 * | 5/2006 | Hoshino | 416/62 |
| 2006/0056972 | A1 * | 3/2006 | DeLong | 416/132 B |

* cited by examiner

*Primary Examiner* — Edward Look
*Assistant Examiner* — Aaron R Eastman
(74) *Attorney, Agent, or Firm* — Charles L. Riddle, Esq.; Riddle Patent Law, LLC

(57) ABSTRACT

An airfoil 11 for attachment to a hub 13 of a windmill 15 or other turbomachine, the airfoil 11 comprises a leading rod 17 and a trailing rod 27, the leading rod 17 and trailing rod 27 preferably are flexible and able to deflect in a direction opposite to that of the direction of rotation, the leading rod 17 having a first end 19 and a second end 21, the first end 19 secured by a leading rod mount 23 of the hub 13 located at a leading mount location 25, the trailing rod 27 has a base end 29 and a tip end 31, the tip end 31 connected with the second end 21 of the leading rod 17, and the base end 29 secured by a trailing rod mount 33 of the hub 13 located at a trailing mount location 35, and fabric sleeve 37 is stretched over the leading rod 17 and the trailing rod 27; the aerodynamic characteristics of each airfoil are configurable by modifying the orientation of the position/alignment of the leading red 17 relative to the trailing rod 27; and the invention including an assembly of airfoils attached to a hub 13, and a method of harnessing energy using the airfoil 11 of the invention.

3 Claims, 4 Drawing Sheets

SEMI-RIGID WIND BLADE

This application incorporates by reference and claims priority to U.S. provisional patent application Ser. No. 61/085,121 filed Jul. 31, 2008.

BACKGROUND OF THE INVENTION

1. Field of the Invention

The invention relates to blades for windmills and turbomachines.

2. Discussion of Related Prior Art

Wind turbines are widely used to harness wind energy for beneficial use. Such uses include pumping water, running mechanical devices such as milling equipment, and in recent times creating electrical energy. Wind turbines generally fall in two categories: vertical axis and horizontal axis, and they typically comprise a plurality of blades attached to a hub that is attached to a shaft. As the wind contacts the blades, it causes the blades to rotate the shaft.

Much attention is given to the aerodynamic properties of turbomachine blades, and airfoil theory for the blades. U.S. Pat. No. 6,030,179 provides a detailed discussion of the significance of blade design as it relates to wind turbines and discloses a number of blade designs used in the art in attempts to achieve maximum efficiency for a given set of wind conditions.

Using atmospheric wind to generate power requires a method to spin an electrical generator with the maximum amount of torque and speed for a given wind speed. An asymmetrical airfoil is often selected for Horizontal Axis Wind Turbines (HAWT) because the lifting force can be used to drive a propeller. Through extensive previous research, it has been found that using airfoil lifting force achieves the greatest amount of power for a given wind speed, with the maximum amount possible governed by Betz Law. The same variables exist to determine the amount of lift for a wind turbine airfoil as an airplane wing. However a wing rotating about a fixed axis creates a range of velocities that increase along an airfoil from the base attached at the hub to the tip, where the blade velocity is at a maximum.

The relative velocity and angle of attack that a wind turbine blade experiences depends upon this velocity profile, wind speed, and blade geometry. These factors therefore determine the amount of lift that can be created and thereby the amount of power available to turn a generator.

The largest variable governing wind turbine blade design is the variation of wind speed. As stated previously, the amount of power available in the wind increases as the cube of the wind speed, so most designers disregard wind turbine output below 5-7 mph due to the low output. Most commercial wind turbines are designed to optimally perform in a range from 7 mph to 23 mph.

Even within this relatively small range of wind speeds, the variables affecting lift can change along the length of a wind turbine blade resulting in varying degrees of lift. For a fixed blade with an initial angle of attack of 10 degrees, the following chart shows the relative velocity a section of blade 24" from the center of rotation experiences, along with the angle of attack:

| Vwind (mph) | Apparent Velocity (mph) | Angle of attack (degrees) |
| --- | --- | --- |
| 0 | 0.0 | 80.0 |
| 3 | 4.6 | 31.2 |
| 5 | 7.6 | 31.2 |
| 7 | 21.2 | 9.3 |
| 10 | 30.3 | 9.3 |
| 12 | 36.3 | 9.3 |
| 15 | 29.8 | 20.3 |
| 20 | 39.7 | 20.3 |
| 25 | 49.6 | 20.3 |

These charts use an assumption of tip speed ratio (TSR) which is the speed of the blade tip versus the speed of the wind. It can be seen that a fixed blade will only achieve the ideal angle of attack (>0 degrees and <12 degrees) for a small range of wind speed.

One of the problems this creates is at lower speeds where the angle of attack is not great enough to create substantial lift. It's common for wind turbines to not turn at all at speeds less than 5 mph, and it requires a sustained amount of wind to turn fast enough to achieve an angle of attack resulting in lift. As wind power is becoming widely adopted, turbines are put into areas that have variable wind speeds or lower overall averages. A fixed blade will only generate power when there are sustained winds over a given wind speed, and it can turn fast enough to generate lift.

One approach today is to design a blade that has a steeper pitch in closer to the hub; this presents a better angle of attack at lower wind speeds and allows the turbine to start up faster, generating more overall power (see chart below for the same example at a pitch of 32 degrees).

| Vwind (mph) | Apparent Velocity (mph) | Angle of attack (degrees) |
| --- | --- | --- |
| 0 | 0.0 | 58.0 |
| 3 | 4.6 | 9.2 |
| 5 | 7.6 | 9.2 |
| 7 | 21.2 | −12.7 |
| 10 | 30.3 | −12.7 |
| 12 | 36.3 | −12.7 |
| 15 | 29.8 | −1.7 |
| 20 | 39.7 | −1.7 |
| 25 | 49.6 | −1.7 |

This design approach gives rise to a compromise, as some amount of power is given up at higher speeds in order to get the turbine turning sooner. A common approach is to vary the angle of attack along the length of the blade, compromising peak efficiency for a wider range of usable wind speeds.

Large-scale commercial turbines are able to vary the blade pitch during operation, thereby achieving a high degree of efficiency for a very wide range of wind speeds. This requires complex mechanisms and controls, and is not currently used on small scale wind turbines.

Other aspects of the airfoil can be changed to maximize lift for a range of wind speeds. As stated before, increasing chord length is second variable that can achieve more lift for a given wind speed. There is a trade-off between chord length and increasing drag, which will slow a blade down. This effect is similar to trailing edge wing flaps on an airplane that deploy to increase lift and lower airspeeds. Due to the complexity of mechanisms on a wind turbine blade, this method is not currently used.

A third way to maximize lift is to increase the camber. This is the relative curvature of the airfoil shape, which affects the air speeds on the top and bottom. In general, increasing a wing's camber will increase lift up to a certain airspeed where drag becomes a greater factor.

Optimization of the various factors of a given blade design in the prior art results in a rigid or sculpted monolithic airfoil design, which results in added weight to the turbine. As a consequence, more energy is needed to turn the wind turbine. In addition, optimization is usually for a given range of atmospheric wind speed. If the atmospheric winds are outside of this range the wind turbine is out of optimization.

Rigid blades also are incapable of flexing to spill off wind in high wind situations, and are also incapable of flexing in reaction to turbulent winds, or winds passing in a non-laminar condition. Rigid blades also make windmills cumbersome and less portable and more difficult to set up.

Currently, there is a need for a blade design that can be manipulated to vary its cord length, camber and angle of attack along the length of the blade to have uniform or non-uniform characteristics based on wind conditions. Also, a need exists to have a blade design that can flex to the various forces of atmospheric winds.

SUMMARY OF THE INVENTION

The present invention may be embodied as an airfoil for attachment to a hub of a windmill, the airfoil comprising:
a leading rod having a first end and a second end, the first end secured by a leading rod mount of the hub located at a leading mount location,
a trailing rod having a base end and a tip end, the tip end connected with the second end of the leading rod, and the base end secured by a trailing rod mount of the hub located at a trailing mount location, and
a fabric sleeve stretched over the leading rod and the trailing rod.

The present invention may also be embodied as a method of producing energy from wind comprising the steps of:
I. providing a wind turbine having a hub;
II. providing a plurality of flexible rods;
III. assembling an airfoil including the steps of
connecting a first end of a leading rod of the plurality of flexible rods to the hub at a leading mount location,
connecting a base end of a trailing rod of the plurality of flexible rods to the hub at a trailing mount location,
attaching the leading rod to the trailing rod, and
securing a sleeve of fabric around the leading rod and trailing rod,
IV. repeating step III for one or more additional airfoils; and
V. turning the hub, wherein the hub is mechanically coupled with a generator or alternator which produces power as the hub turns.

BRIEF DESCRIPTION OF THE DRAWINGS

The advantages, various additional features, and nature of the invention will appear more fully upon consideration of the illustrative embodiment of the invention which is schematically set forth in the drawings, in which.

DETAILED DESCRIPTION OF THE DRAWINGS

Figure 1:
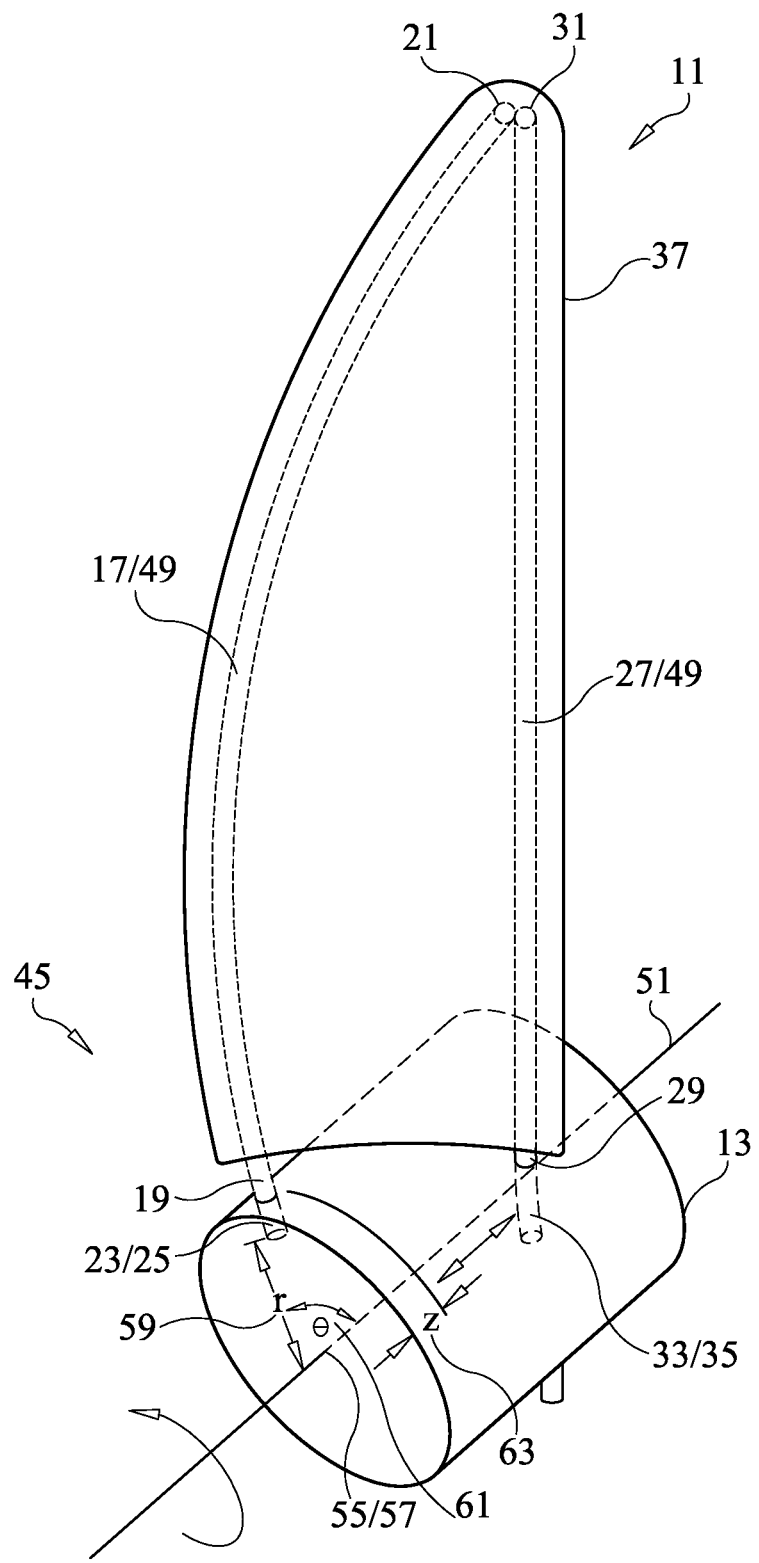
FIG. 1 shows an isometric view of an airfoil and hub.

While the invention is open to various modifications and alternative forms, specific embodiments thereof are shown by way of examples in the drawings and as described herein in detail. There is no intent to limit the invention to the particular forms disclosed.

Turning to the drawings, FIG. 1 shows an airfoil 11 for attachment to a hub 13 of a windmill. It is understood that the airfoil 11 if the invention applies to turbomachines in general such as a windmill, a fan, a propeller, etc. The airfoil 11 comprises a leading rod 17 and a trailing rod 27. The leading rod 17 and trailing rod 27 preferably are flexible and able to deflect in a direction opposite to that of the direction of rotation. The leading rod 17 having a first end 19 and a second end 21, the first end 19 secured by a leading rod mount 23 of the hub 13 located at a leading mount location 25. The trailing rod 27 has a base end 29 and a tip end 31. The tip end 31 connected with the second end 21 of the leading rod 17, and the base end 29 secured by a trailing rod mount 33 of the hub 13 located at a trailing mount location 35.

A fabric sleeve 37 is shown stretched over the leading rod 17 and the trailing rod 27. Preferably, the fabric of the fabric sleeve 37 is made from a suitable material for outdoor use. Alternately, the fabric may comprise of coatings or material processing for improving aerodynamic characteristics. Also, the fabric sleeve 37 may alternately comprise more than one component of fabric. For example, stiffer materials such as Mylar can be layered or added to more flexible materials to achieve an airfoil shape while maintaining flexibility.

Figure 2:
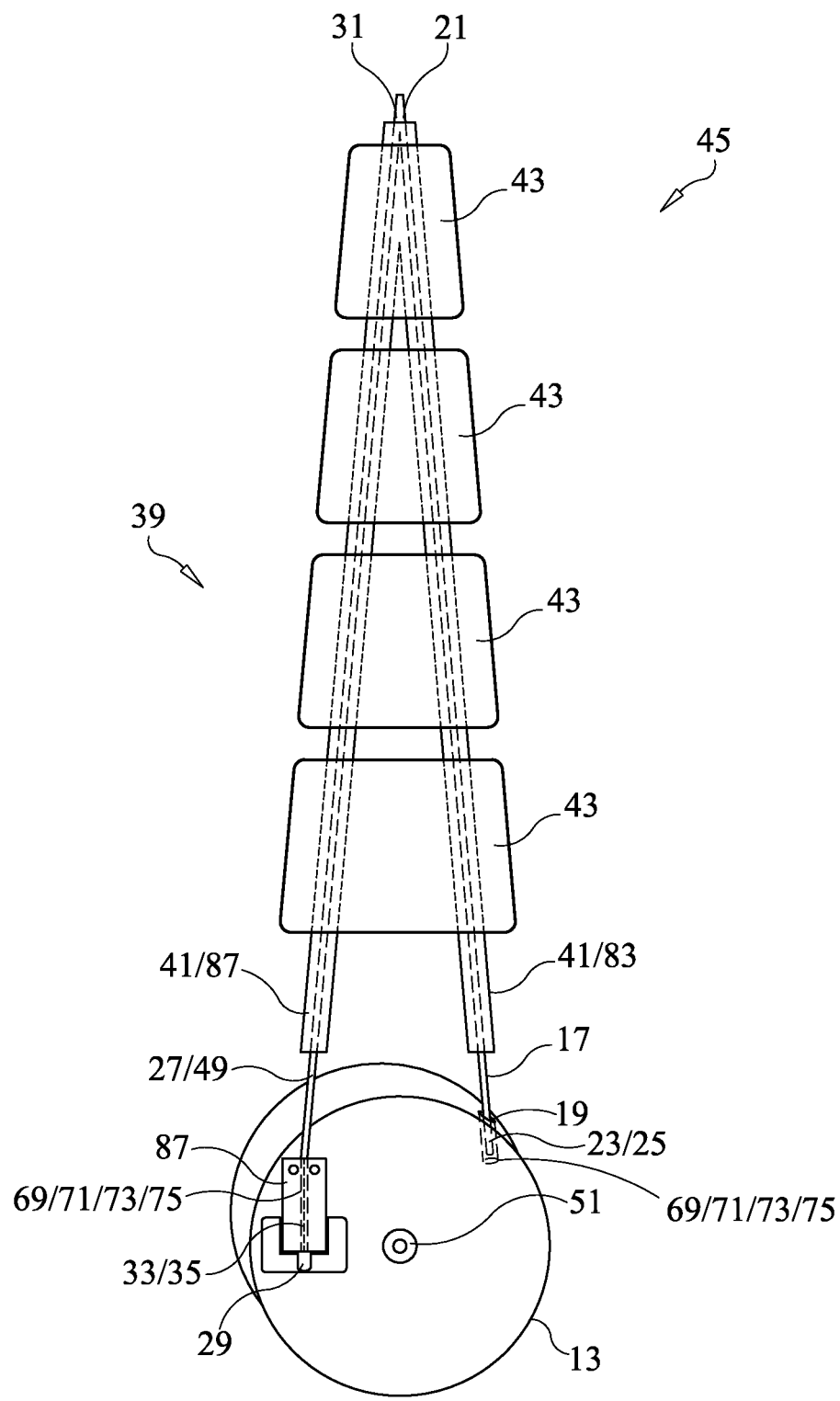
FIG. 2 shows an isometric view of a hub and airfoil assembly showing a fabric substructure.

Referring to FIG. 2, in a preferred embodiment, the airfoil 11 further includes a fabric substructure 39 for creating an aerodynamically improved shape for the fabric sleeve 37 when the fabric sleeve 37 is stretched over the leading rod 17 and trailing rod 19. The fabric substructure 39 comprises a plurality of rod sleeves 41 attached to one or more shape forming skins 43, which envelop said rod sleeves 41 and are more rigid than the fabric sleeve 37.

Referring to FIGS. 1-2, the invention embodies an assembly 45 for a windmill comprising a hub 13 and a plurality of airfoils 11. For each airfoil 11 of the plurality of airfoils 11, the hub has a leading mount location 25 and a trailing mount location 35 for mounting a plurality of flexible rods (17, 27). Each airfoil 11 of the plurality of airfoils structurally comprised as discussed above. The hub 13 rotates about a central axis 51, and the leading mount location 25 and the trailing mount location 35 are definable by a cylindrical coordinate system having an origin 55 defined by a point 57 located along the central axis 51, said cylindrical coordinate system being a combination of radial distance 59 from the central axis 51, angular position 61 about the central axis 51, and displacement 63 along the central axis 51.

As discussed herein each airfoil 11 is configurable to exhibit specific properties of angle of attack, twisted angle of attack or varied angle of attack, chord length, and camber by setting and/or modifying the location of the leading rod 17 relative to the trailing rod 27. This is accomplished by having the leading rod mount 23 at a leading rod mount location 25 and the trailing rod mount 33 at a trailing rod mount location 35. By example, the assembly 45 may be configured to have the leading mount location 25 and the trailing mount location 35 at the same radial distance 59 from the origin 55.

Similarly, the radial distance 59 of the leading mount location 25 and the radial distance 59 of the trailing mount location 35 may not be the same, thereby changing the relative orientation and flex on the leading rod 17 and/or the trailing rod 27. The angular position 61 of the leading mount location 25 may differ from the angular position 61 of the trailing mount location 35, causing an angle of attack to be established.

The displacement 63 along the central axis 51 of the leading mount location 25 can differ from the displacement 63 along the central axis 51 of the trailing mount location 35, causing camber in the airfoil 11.

Figure 4:
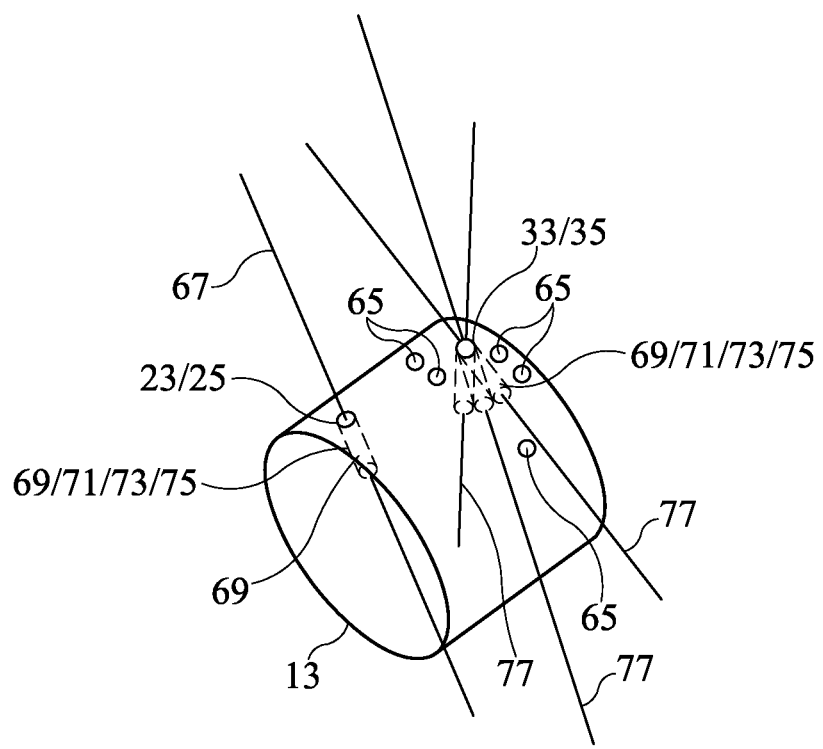
FIG. 4 shows one embodiment of the invention having a plurality of mounting configurations for the leading edge rod and the trailing edge rod.
Figure 5:
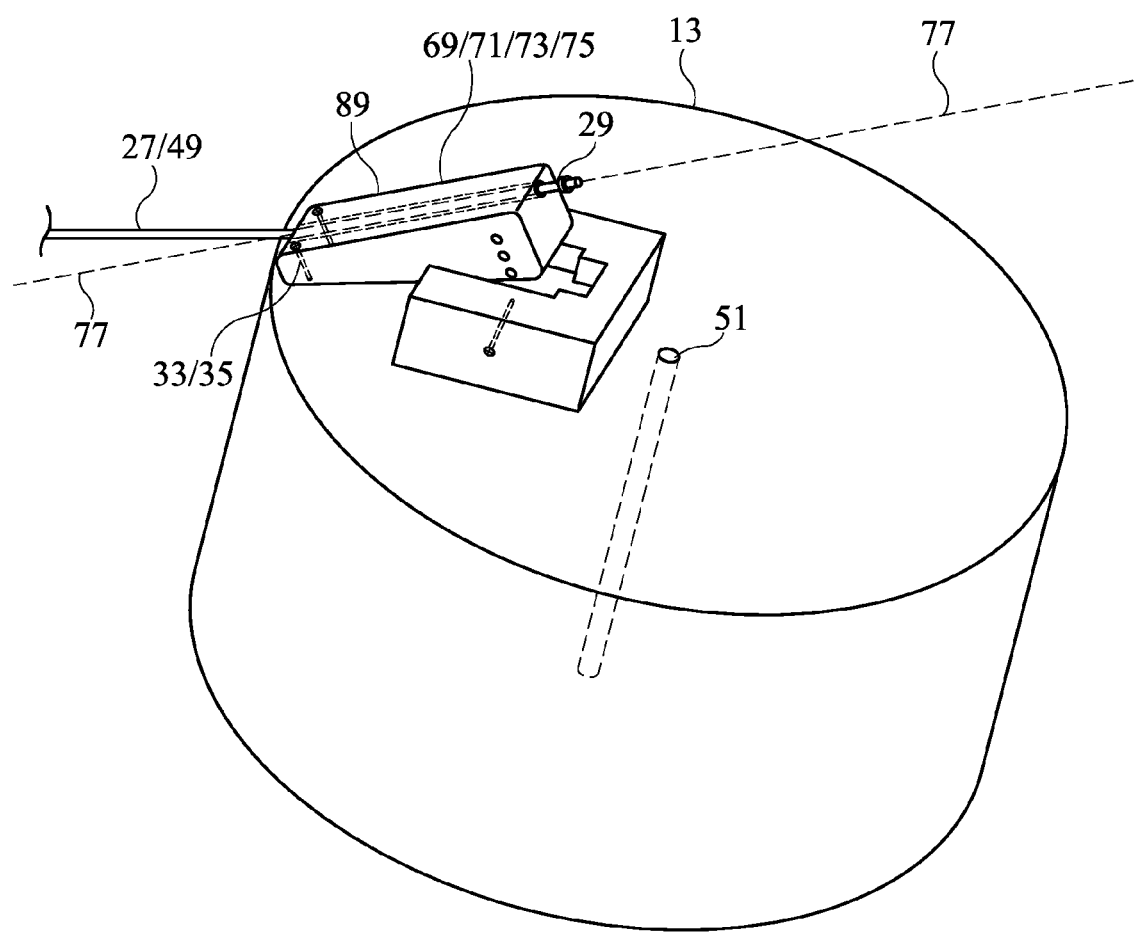
FIG. 5 shows a trailing edge mount according to one embodiment of the invention.

According to the principles discussed and referred to herein, the assembly is modifiable to accommodate a plurality of configurations, each optimal to a particular set of ambient wind conditions. FIG. 4 shows the hub 13 having a plurality of additional trailing mount locations 65, each definable by the cylindrical coordinate system as discussed herein, and each of the plurality of additional trailing mount locations 65 having a set of coordinates (actual coordinates not shown in FIGS.) that differ from the trailing mount location 35 and/or another of the plurality of additional trailing mount locations 65, allowing a user to select among an array of airfoil configurations by moving the trailing rod mount 33 among the plurality of additional trailing mount locations 65.

Figure 3:
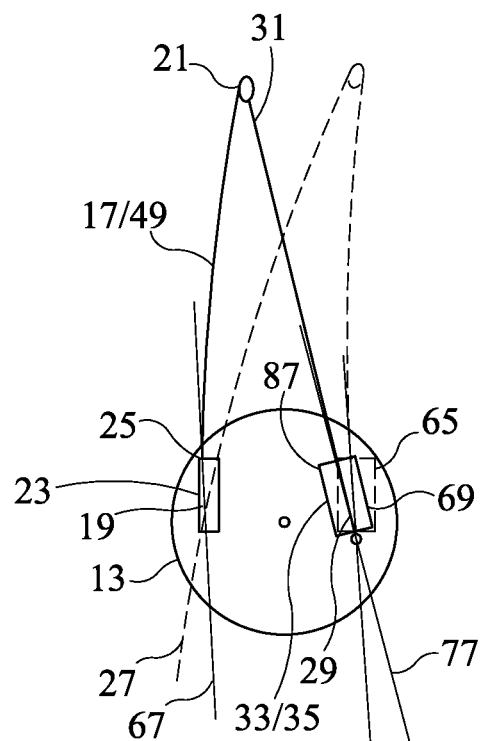
FIG. 3 is a schematic view showing variable alignment of the airfoil by modifying the positioning of the trailing edge rod.

Referring to FIGS. 3-4, each airfoil 11 is configurable to exhibit specific properties of angle of attack, twisted angle of attack or varied angle of attack, chord length, and camber by setting and/or modifying the leading rod axis of alignment 67 and/or the trailing rod axis of alignment 77. When, for example, the trailing rod axis of alignment 77 varies relative to the leading rod axis of alignment 67, characteristics such as angle of attack, twisted angle of attack or varied angle of attack, chord length, and camber are varied. The leading rod mount 23 has a leading rod axis of alignment 67 and comprises an engaging member such as cup 71, a bore 73, or a tube 75 for engaging the first end of the leading rod 17. At its simplest form, the trailing rod mount 35 has a trailing rod axis of alignment 77 and comprises a cup 71, a bore 73, or a tube 75 for engaging the base end 29 of the trailing rod 27. When the leading rod axis of alignment 67 and the trailing rod axis of alignment 77 are parallel, the airfoil can have a uniform angle of attack under no loading. When the leading rod axis of alignment 67 and the trailing rod axis of alignment 77 are not parallel, the airfoil 11 can have a twisted angle of attack (or varying angle of attack) along the length of the airfoil 11. Depending on the trailing rod axis of alignment, camber, chord length, and/or angle of attack all can take different parameters, and are configurable to be optimal for power extraction or output for given ambient wind conditions.

In a preferred embodiment and for ease of use and reduction on the amount of variables in configuration, the leading rod axis of alignment 67 is fixed, and the trailing rod axis of alignment 77 is variable.

Varying the trailing rod axis of alignment 77 is accomplished in the embodiments discussed herein, but not limited to said specific embodiments as routine design elements can accomplish the same. Referring to FIGS. 2-5, the trailing rod mount includes an axis variation pivot 87 for enabling the configuration of a plurality of axes which can be set as the trailing rod axis of alignment 77. This axis variation pivot 87 allows a user to modify the trailing rod axis of alignment 77 according to a plurality of preset positions.

The invention includes a method of producing energy from wind comprising the steps of providing a wind turbine (not shown) having a hub 13, and providing a plurality of flexible rods. An 11 airfoil is assembled including the steps of connecting a first end 19 of a leading rod 17 of the plurality of flexible rods to the hub 13 at a leading mount location 25, connecting a base end 29 of a trailing rod 27 of the plurality of flexible rods to the hub 13 at a trailing mount location 35, attaching the leading rod 17 to the trailing rod 27, and securing a sleeve 37 of fabric around the leading rod and trailing rod. The steps above are repeated for the assembly of each additional airfoil. When wind contacts the airfoils, turning the hub 13, power is produced when the hub is mechanically coupled with a generator or alternator. Similarly the mechanical energy resulting from the turning hub 13 can be coupled with other devices than a generator to use the energy. Said other devices may include a pump, an aerator, or other similar rotating device.

Assembling the airfoil 11 step may further include threading the first end 19 of the leading rod 17 through a leading rod sleeve 83 of a fabric substructure 39 and threading the base end 29 of the trailing rod 27 through a trailing rod sleeve 85 of the fabric substructure 39 to seat the fabric substructure 39 on the rods 17/27. As discussed above, the method may include the step of adjusting the shape and or angle of attack of a portion of one or more of the plurality of airfoils 11 by moving the trailing mount location 35 and/or modifying the trailing rod axis of alignment 77 at the trailing mount location 35 to create a modified airfoil shape and/or angle of attack along portions of the airfoil 11.

The fabric sleeves 37 of each airfoil 11 being removable the invention includes changing the color or pattern of the plurality of airfoils 11 by replacing the fabric sleeve 37 with a fabric sleeve 37 of another color or pattern. The lightweight design of the invention allows a user to assemble, disassemble, stow and transport the airfoils 11, hub 13, and windmill with relative ease. The fabric sleeves 37 of each airfoil 11 may also be replaced due to weathering and impact damage, incurring a minimum cost since the underlying structure is protected. The repair of rigid blades of the prior art is cumbersome and involves filling the blade with resin, sanding the blade, painting the blade, and balancing the blade before being returned to service.

It is of course understood that departures can be made from the preferred embodiments of the invention by those of ordinary skill in the art without departing from the spirit and scope of the invention that is limited only by the following claims.

The invention claimed is:

1. An airfoil for attachment to a hub of a windmill, the airfoil comprising:
   a leading rod having a first end and a second end, the first end secured by a leading rod mount of the hub located at a leading mount location,
   a trailing rod having a base end and a tip end, the tip end connected with the second end of the leading rod, and the base end secured by a trailing rod mount of the hub located at a trailing mount location,
   a fabric sleeve stretched over the leading rod and the trailing rod, and
   a fabric substructure for creating an aerodynamically improved shape for the fabric sleeve when stretched over the leading rod and trailing rod, the fabric substructure comprising a plurality of rod sleeves attached to one or more shape forming skins, which envelop said rod sleeves and are more rigid than the fabric sleeve.

2. An assembly for a windmill comprising a hub and a plurality of airfoils:

for each airfoil of the plurality of airfoils, the hub having a leading mount location and a trailing mount location for mounting a plurality of flexible rods, and each airfoil of the plurality of airfoils having:

a leading rod having a first end and a second end, the first end secured by a leading rod mount of the hub located at the leading mount location, a trailing rod having a base end and a tip end, the tip end selectively connected with the second end of the leading rod, and the base end secured by a trailing rod mount of the hub, and a fabric sleeve stretched over the leading rod and the trailing rod, wherein the hub rotates about a central axis, and the leading mount location and the trailing mount location are definable by a cylindrical coordinate system having an origin defined by a point located along the central axis, said cylindrical coordinate system being a combination of radial distance from the central axis, angular position about the central axis, and displacement alone the central axis, and one or more of the following:

a. the trailing rod mount of the hub is located at the trailing mount location, and the radial distance of the leading mount location and the radial distance of the trailing mount location are not the same;

b. the hub has a plurality of additional trailing mount locations, each definable by the cylindrical coordinate system and each of the plurality of additional trailing mount locations having a set of coordinates that differ from the trailing mount location and / or another of the plurality of additional trailing mount locations, allowing a user to select among an array of airfoil configurations by moving the trailing rod mount among the plurality of additional mount locations;

c. the leading rod mount has a leading rod axis of alignment and comprises an engaging member such as cup, a bore, or a tube for engaging the first end of the leading rod, and the leading rod axis of alignment and the trailing rod axis of alignment are parallel;

d. the leading rod mount has a leading rod axis of alignment and comprises an engaging member such as cup, a bore, or a tube for engaging the first end of the leading rod, the trailing rod mount has a trailing rod axis of alignment and comprises a cup, a bore, or a tube for engaging the base end of the trailing rod, and the leading rod axis of alignment is fixed, and the trailing rod axis of alignment is variable; and e. the leading rod mount has a leading rod axis of alignment and comprises an engaging member such as cup, a bore, or a tube for engaging the first end of the leading rod, the trailing rod mount has a trailing rod axis of alignment and comprises a cup, a bore, or a tube for engaging the base end of the trailing rod, and the trailing rod mount includes an axis variation pivot for enabling the configuration of a plurality of axes which can be set as the trailing rod axis of alignment.

3. A method of producing energy from wind comprising the steps of:

I. providing a wind turbine having a hub;

II. providing a plurality of flexible rods;

III. assembling an airfoil including the steps of
connecting a first end of a leading rod of the plurality of flexible rods to the hub at a leading mount location,
connecting a base end of a trailing rod of the plurality of flexible rods to the hub at a trailing mount location,
attaching the leading rod to the trailing rod, and
securing a sleeve of fabric around the leading rod and trailing rod, IV. repeating step III for one or more additional airfoils;

V. turning the hub, wherein the hub is mechanically coupled with a generator or alternator which produces power as the hub turns; and either or both of:

VI(a) adjusting a shape and or angle of attack of a portion of one or more of the plurality of airfoils by moving the trailing mount location, and changing the color or pattern of the plurality of airfoils by replacing the fabric sleeve with a fabric sleeve of another color or pattern, and VI(b) the trailing rod having a trailing rod axis of alignment at a trailing mount location, and the method further including the step of modifying the trailing rod axis of alignment at the trailing mount location to create a modified airfoil shape and / or angle of attack along portions of the airfoil.

* * * * *